(12) United States Patent
Wakimoto et al.

(10) Patent No.: US 11,316,235 B2
(45) Date of Patent: Apr. 26, 2022

(54) PRISMATIC SECONDARY BATTERY, ASSEMBLED BATTERY USING THE SAME AND METHOD OF PRODUCING THE SAME

(71) Applicants: SANYO Electric Co., Ltd., Daito (JP); Panasonic Corporation, Kadoma (JP)

(72) Inventors: Ryoichi Wakimoto, Hyogo (JP); Kazuhiro Kitaoka, Hyogo (JP); Isao Fujiwara, Hyogo (JP); Hiromasa Yagi, Osaka (JP)

(73) Assignees: SANYO Electric Co., Ltd., Daito (JP); Panasonic Corporation, Kadoma (JP)

( * ) Notice: Subject to any disclaimer, the term of this patent is extended or adjusted under 35 U.S.C. 154(b) by 1301 days.

(21) Appl. No.: 15/153,032

(22) Filed: May 12, 2016

(65) Prior Publication Data

US 2016/0336545 A1    Nov. 17, 2016

(30) Foreign Application Priority Data

May 15, 2015  (JP) .............................. JP2015-099582

(51) Int. Cl.
*H01M 50/578* (2021.01)
*H01M 50/54* (2021.01)

(52) U.S. Cl.
CPC ......... *H01M 50/578* (2021.01); *H01M 50/54* (2021.01); *H01M 2200/20* (2013.01)

(58) Field of Classification Search
CPC .. H01M 2/025; H01M 2/345; H01M 2200/00; H01M 2200/20
See application file for complete search history.

(56) References Cited

U.S. PATENT DOCUMENTS

| 7,781,088 B2 | 8/2010 | Yamauchi et al. |
| 8,304,109 B2 | 11/2012 | Nansaka et al. |
| 8,906,545 B2 | 12/2014 | Hattori et al. |
| 9,099,734 B2 | 8/2015 | Yokoyama et al. |
| 2009/0004561 A1 | 1/2009 | Nansaka et al. |
| 2009/0239133 A1 | 9/2009 | Kosugi |
| 2012/0107652 A1* | 5/2012 | Iyori ..................... H01M 2/263 429/61 |
| 2017/0373303 A1* | 12/2017 | Ito .......................... H01G 11/74 |

FOREIGN PATENT DOCUMENTS

| JP | 2006-226625 A | 9/2008 |
| JP | 2009-32640 A | 2/2009 |
| JP | 2013-131402 A | 7/2013 |

\* cited by examiner

*Primary Examiner* — Stewart A Fraser
(74) *Attorney, Agent, or Firm* — WHDA, LLP

(57) ABSTRACT

An electrode body including positive electrode plate and negative electrode plate includes a positive electrode tab portion at an end portion on the sealing plate side. The positive electrode plate is electrically connected to a positive electrode collector including a collector body portion and a collector connection. A pressure-sensitive current breaking mechanism includes a conductive member including an opening portion on an electrode body side, a deformation plate that seals the opening portion, and a collector body portion that is disposed on the electrode body side of the deformation plate and that is connected to the deformation plate. The collector connection is disposed between the current breaking mechanism and one of the large-area side walls of the prismatic outer package, and the positive electrode tab portion is connected to the collector connection.

19 Claims, 10 Drawing Sheets

PRISMATIC SECONDARY BATTERY, ASSEMBLED BATTERY USING THE SAME AND METHOD OF PRODUCING THE SAME

CROSS REFERENCE TO RELATED APPLICATIONS

The present invention application claims priority to Japanese Patent Application No. 2015-099582 filed in the Japan Patent Office on May 15, 2015, the entire contents of which are incorporated herein by reference.

BACKGROUND OF THE INVENTION

Field of the Invention

The present disclosure relates to a prismatic secondary battery, assembled battery using the same and method of producing the same.

Description of Related Art

Secondary batteries such as alkaline secondary batteries and nonaqueous electrolyte secondary batteries are used in power sources for driving electric vehicles (EV), hybrid electric vehicles (HEV, PHEV), and the like. In such applications, since a high capacity or a high input characteristics is required, a battery pack in which a plurality of prismatic secondary batteries are connected in series or in parallel is used.

In such prismatic secondary batteries, a battery case is formed by a bottomed tubular prismatic outer package including an opening and a sealing plate that seals the opening. The battery case accommodates therein an electrode body including positive electrode plates, negative electrode plates, and separators, and an electrolyte. A positive electrode terminal and a negative electrode terminal are attached to the sealing plate. The positive electrode terminal is electrically connected to the positive electrode plates through a positive electrode collector, and the negative electrode terminal is electrically connected to the negative electrode plates through a negative electrode collector.

The positive electrode plate includes a positive electrode core body made of metal and a positive electrode active material layer formed on the surface of the positive electrode core body. A positive electrode core body exposed portion, on which no positive electrode active material layer is formed, is formed in a portion of the positive electrode core body. Furthermore, the positive electrode collector is connected to the positive electrode core body exposed portion. Furthermore, the negative electrode plate includes a negative electrode core body made of metal and a negative electrode active material layer formed on the surface of the negative electrode core body. A negative electrode core body exposed portion, on which no negative electrode active material layer is formed, is formed in a portion of the negative electrode core body. Furthermore, the negative electrode collector is connected to the negative electrode core body exposed portion.

For example, Japanese Published Unexamined Patent Application No. 2009-032640 (Patent Document 1) proposes a prismatic secondary battery in which a wound electrode body includes a wound positive electrode core body exposed portion in a first edge portion and a wound negative electrode core body exposed portion in a second edge portion. Furthermore, in Japanese Published Unexamined Patent Application No. 2008-226625 (Patent Document 2), a prismatic secondary battery that uses a wounded electrode body provided with a positive electrode core body exposed portion and a negative electrode core body exposed portion at one end portion is proposed.

BRIEF SUMMARY OF THE INVENTION

Development of on-vehicle secondary batteries, particularly, secondary batteries used in EVs and PHEVs that have a higher energy density and a larger battery capacity are awaited. In the case of the prismatic secondary battery disclosed in Patent Document 1 described above, spaces such as left and right spaces in which the wound positive electrode core body exposed portion and the wound negative electrode core body exposed portion are disposed and an upper space between the sealing plate and the wound electrode body are required in the battery case. Such a requirement is a factor hindering the increase in energy density of the second battery.

Conversely, as is the case of the prismatic secondary battery disclosed in Patent Document 2, when the wound electrode body provided with the positive electrode core body exposed portion and the negative electrode core body exposed portion at one end portion is used, it will be easier to obtain a prismatic secondary battery with a high energy density.

However, the structure of the collector of the prismatic secondary battery disclosed in Patent Document 2 described above tends to become more complex compared to that of the prismatic secondary battery disclosed in Patent Document 1.

The present disclosure provides a prismatic secondary battery, an assembled battery (a battery pack) using the prismatic secondary battery, and a method for manufacturing the prismatic secondary battery, which is high in energy density and capacity and that is highly reliable.

A prismatic secondary battery according to an aspect of the present disclosure includes a positive electrode plate that includes a positive electrode tab portion, a negative electrode plate that includes a negative electrode tab portion, an electrode body that includes the positive electrode plate and the negative electrode plate, a prismatic outer package that includes an opening, a bottom, a pair of large-area side walls and a pair of small-area side walls, the prismatic outer package housing the electrode body, a sealing plate that seals the opening, a positive electrode terminal electrically connected to the positive electrode plate, the positive electrode plate being installed in the sealing plate, a negative electrode terminal electrically connected to the negative electrode plate, the negative electrode terminal being installed in the sealing plate, and a pressure-sensitive current breaking mechanism provided in a conductive path between the positive electrode plate and the positive electrode terminal or in a conductive path between the negative electrode plate and the negative electrode terminal. In the prismatic secondary battery, the positive electrode tab portion and the negative electrode tab portion are disposed at an end portion of the electrode body on a sealing plate side, the collector includes a collector body portion and a collector connection, the current breaking mechanism includes a conductive member having an opening portion on an electrode body side, a deformation plate that seals the opening portion, and the collector body portion that is disposed on the electrode body side of the deformation plate and that is connected to the deformation plate, the collector connection is disposed between the current breaking mechanism and the large-area side walls, the positive electrode tab portion or the negative electrode tab portion is connected to the collector connection, and the conductive path between the positive electrode plate and the positive electrode terminal or the conductive path between the negative electrode plate and the negative electrode terminal is disconnected upon breakage of a fragile portion caused by deformation of the deformation plate deforming when a pressure inside the battery is equivalent to or above a predetermined value.

In the above configuration, since the positive electrode tab portion and the negative electrode tab portion are disposed at the end portion of the electrode body on the sealing plate side, spaces in the prismatic outer package in which members that are not involved with generation of electricity are disposed can be reduced. Accordingly, a prismatic secondary battery that has a further higher energy density and that has a large battery capacity can be obtained.

Furthermore, in the above configuration, since the pressure-sensitive current breaking mechanism is provided, when the battery becomes overcharged, the overcharging can be prevented from progressing; accordingly, the battery becomes highly reliable. Note that, desirably, the fragile portion is provided in the deformation plate or in the collector.

In the configuration described above, by disposing the collector connection, which is connected to the positive electrode tab portion or the negative electrode tab portion, between the current breaking mechanism and the large-area side wall of the prismatic outer package, the prismatic secondary battery can be further high in energy density.

Note that in the present application, in the prismatic secondary battery, the sealing plate side of the prismatic secondary battery is the upper side, and the bottom side of the prismatic outer package is the lower side.

Desirably, the collector connection extends towards the sealing plate side from an end portion of the collector body portion.

Desirably, the fragile portion is formed in the collector body portion and around a connection between the collector body portion and the deformation plate. Furthermore, desirably, a thin wall portion or a groove portion is provided as the fragile portion. Note that the joint portion between the collector and the deformation plate may be the fragile portion. Alternatively, the fragile portion may be provided in the deformation plate.

Desirably, the collector includes a first collector connection and a second collector connection that serve as the collector connection, the first collector connection is disposed between one of the pair of large-area side walls and the current breaking mechanism, and the second collector connection is disposed between the other one of the pair of large-area side walls and the current breaking mechanism.

An angle of the collector connection against the collector body portion is preferably 2250 to 3000 and, more preferably, is 240° to 280°. Note that the angle is an angle formed between the surface of the collector body portion on the electrode body side and the surface of the collector connection on the large-area side wall side.

Desirably, a receiving component is provided, and the positive electrode tab portion or the negative electrode tab portion is connected to the collector connection while held between the collector connection and the receiving component.

A plurality of the prismatic secondary battery described above may be connected in series or in parallel such that a battery pack is formed.

According to an aspect of the present disclosure, a method for manufacturing a prismatic secondary battery that is provided with a positive electrode plate that includes a positive electrode tab portion, a negative electrode plate that includes a negative electrode tab portion, an electrode body that includes the positive electrode plate and the negative electrode plate, a collector electrically connected to the positive electrode plate or the negative electrode plate, a prismatic outer package that includes an opening, a bottom, a pair of large-area side walls and a pair of small-area side walls, the prismatic outer package housing the electrode body, a sealing plate that seals the opening, a positive electrode terminal electrically connected to the positive electrode plate, the positive electrode plate being installed in the sealing plate, a negative electrode terminal electrically connected to the negative electrode plate, the negative electrode terminal being installed in the sealing plate, and a pressure-sensitive current breaking mechanism provided in a conductive path between the positive electrode plate and the positive electrode terminal or in a conductive path between the negative electrode plate and the negative electrode terminal, in which the positive electrode tab portion and the negative electrode tab portion are disposed at an end portion of the electrode body on a sealing plate side, the collector includes a collector body portion and a collector connection, the current breaking mechanism includes a conductive member having an opening portion on an electrode body side, a deformation plate that seals the opening portion, and the collector body portion that is disposed on the electrode body side of the deformation plate and that is connected to the deformation plate, the collector connection is disposed between the current breaking mechanism and the large-area side walls, the positive electrode tab portion or the negative electrode tab portion is connected to the collector connection, and the conductive path between the positive electrode plate and the positive electrode terminal or the conductive path between the negative electrode plate and the negative electrode terminal is disconnected upon breakage of a fragile portion caused by deformation of the deformation plate deforming when a pressure inside the battery is equivalent to or above a predetermined value, the method includes a tab-connection step of connecting the collector connection to the positive electrode tab portion or the negative electrode tab portion; and a bending step of bending the collector connection with respect to the collector body portion after the tab-connection step.

The present disclosure is capable of providing a prismatic secondary battery that has a high energy density and a high capacity and that is highly reliable.

DETAILED DESCRIPTION OF THE INVENTION

Figure 1:
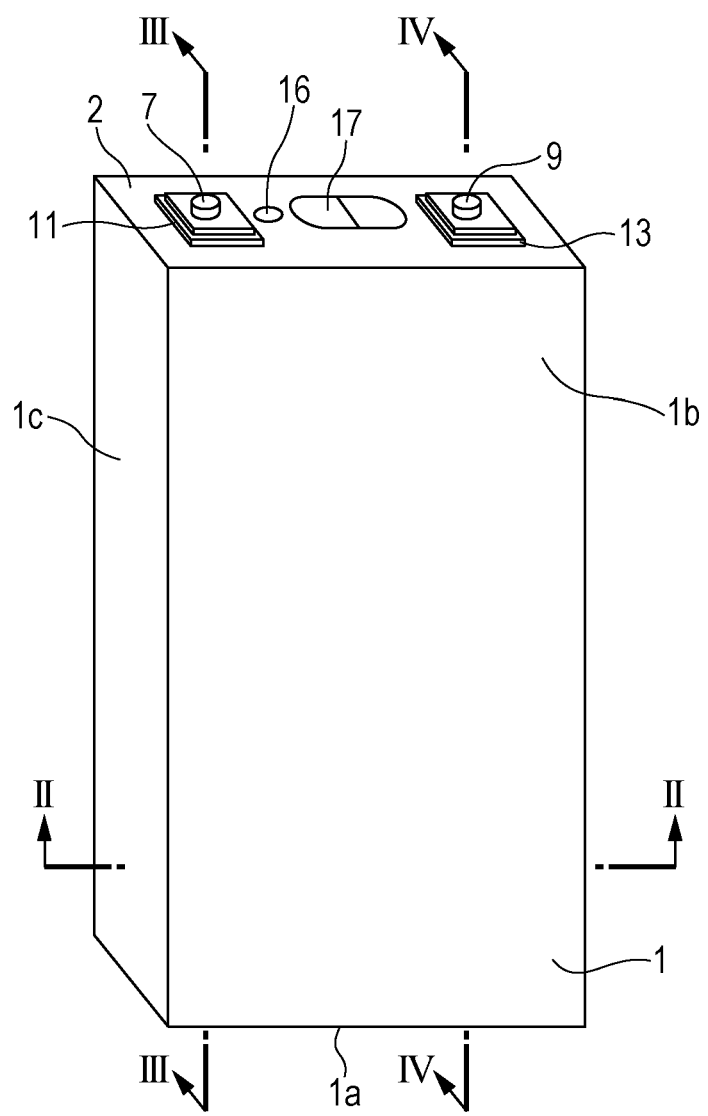
FIG. 1 is a perspective view of a prismatic secondary battery according to an exemplary embodiment.

Hereinafter, a configuration of a prismatic secondary battery 20 according to an exemplary embodiment will be described. Note that the present disclosure is not limited to the following exemplary embodiment.

As illustrated in FIG. 1 to 4, the prismatic secondary battery 20 includes a prismatic outer package 1 that has an opening, and a sealing plate 2 that seals the opening. The prismatic outer package 1 and the sealing plate 2 are desirably made of metal and, for example, may be made of aluminum or an aluminum alloy. The prismatic outer package 1 includes a bottom 1a, a pair of large-area side walls 1b, and a pair of small-area side walls 1c. The area of each large-area side wall is larger than the area of each small-area side wall. The prismatic outer package 1 is a bottomed and tubular prismatic outer package having a rectangular shape and includes the opening at a position facing the bottom 1a. A stacked electrode body 3 in which a plurality of positive electrode plates and a plurality of negative electrode plates are stacked with separators interposed therebetween are accommodated in the prismatic outer package 1 together with an electrolyte. Each positive electrode plate includes a positive electrode core body made of metal and positive electrode active material layers that include a positive electrode active material and that are formed on the positive electrode core body. Each positive electrode plate includes, at one of its end, a positive electrode core body exposed portion 4b in which the positive electrode core body is exposed. Desirably, an aluminum foil or an aluminum alloy foil is used for the positive electrode core body. Each negative electrode plate includes a negative electrode core body made of metal and negative electrode active material layers that include a negative electrode active material and that are formed on the negative electrode core body. Each negative electrode plate includes, at one of its end, a negative electrode core body exposed portion 5b in which the negative electrode core body is exposed. Desirably, a copper foil or a copper alloy foil is used for the negative electrode core body. In the prismatic secondary battery 20, each positive electrode core body exposed portion 4b constitutes a positive electrode tab portion 4c, and each negative electrode core body exposed portion 5b constitutes a negative electrode tab portion 5c.

Figure 2:
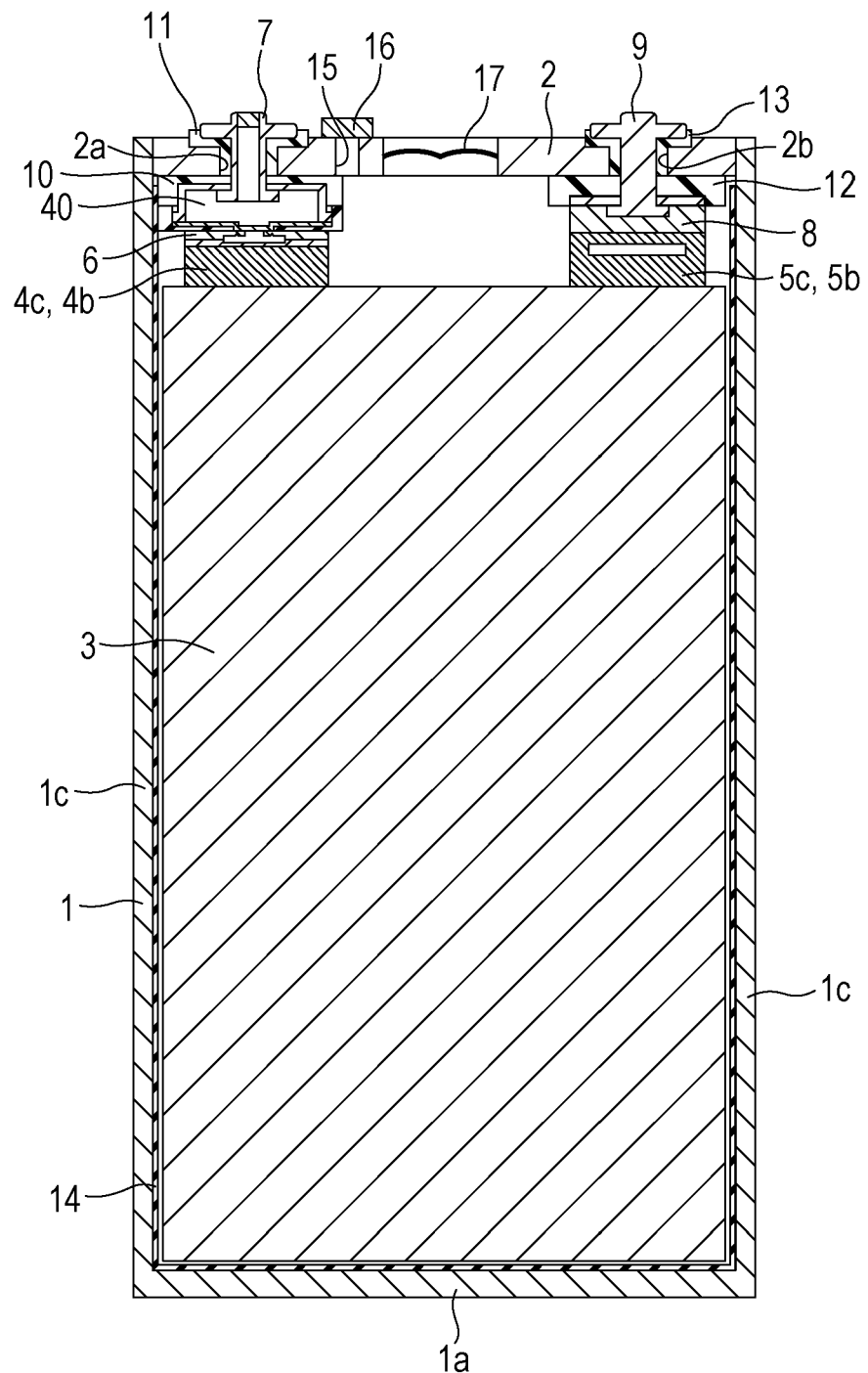
FIG. 2 is a cross-sectional view taken along line II-II in FIG. 1.
Figure 3:
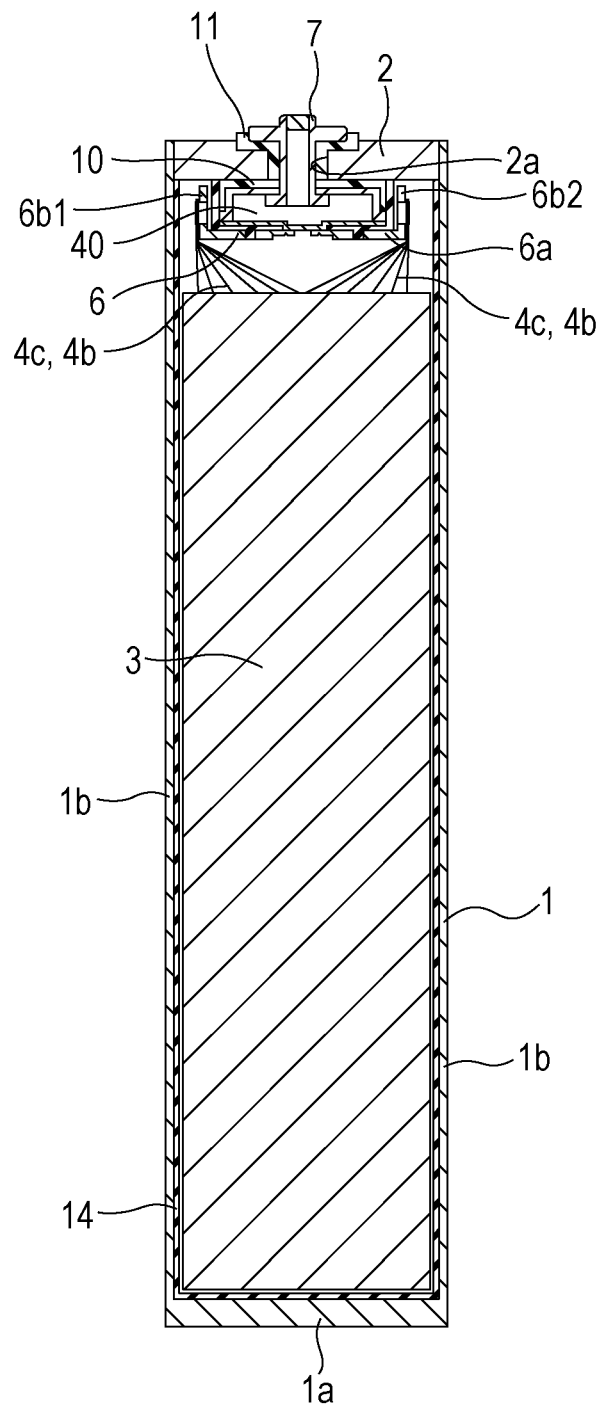
FIG. 3 is a cross-sectional view taken along line III-III in FIG. 1.
Figure 4:
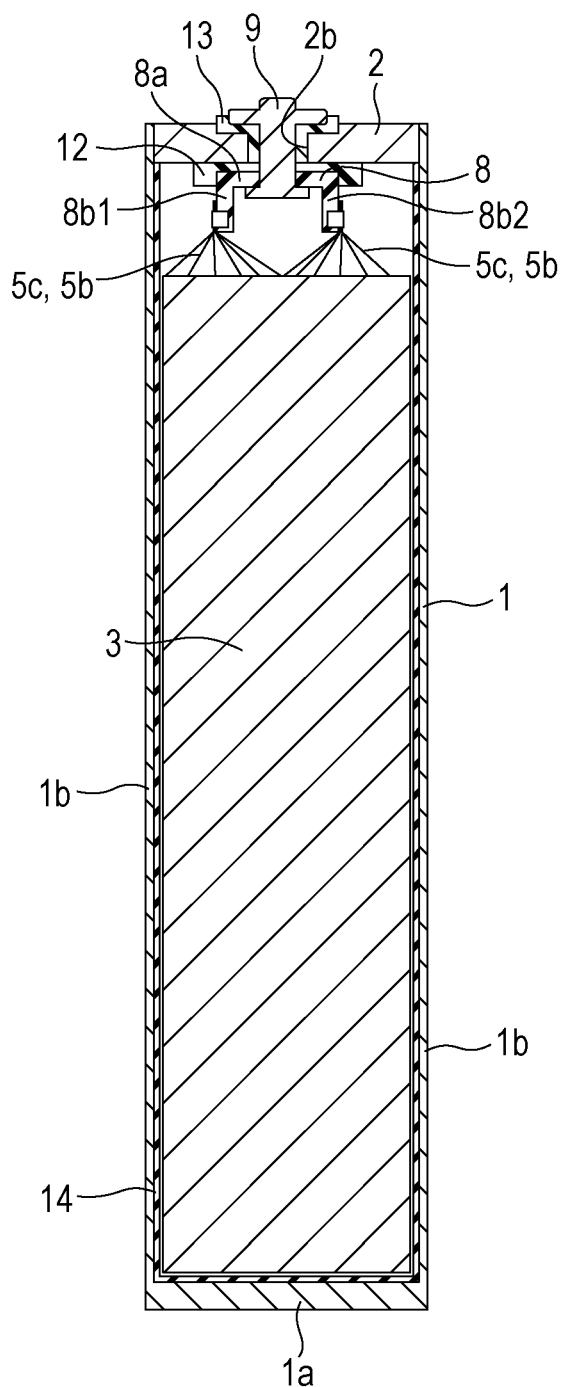
FIG. 4 is a cross-sectional view taken along line IV-IV in FIG. 1.

As illustrated in FIGS. 2 to 4, at an end portion on the sealing plate 2 side of the electrode body 3, positive electrode tab portions 4c are disposed in a stacked state and the negative electrode tab portions 5c are disposed in a stacked state. A positive electrode collector 6 is joined to the stacked positive electrode tab portions 4c. Furthermore, a positive electrode terminal 7 is electrically connected to the positive electrode collector 6. A negative electrode collector 8 is joined to the stacked negative electrode tab portions 5c. Furthermore, a negative electrode terminal 9 is electrically connected to the negative electrode collector 8. A pressure-sensitive current breaking mechanism 40 is provided in the conductive path between the positive electrode plates and the positive electrode terminal 7. The current breaking mechanism 40 is disposed between the electrode body 3 and the sealing plate 2. The current breaking mechanism 40 is activated when the pressure inside the battery becomes equivalent to or higher than a predetermined value, and the current is cut off by cutting off the conductive path between the positive electrode plates and the positive electrode terminal 7. Note that the pressure-sensitive current breaking mechanism 40 may be provided in the conductive path between the negative electrode plates and the negative electrode terminal 9.

The positive electrode terminal 7 is attached to the sealing plate 2 in an electrically insulated state with the sealing plate 2 with an insulating member 10 and an insulating gasket 11. The negative electrode terminal 9 is attached to the sealing plate 2 in an electrically insulated state with the sealing plate 2 with an insulating member 12 and an insulating gasket 13. The insulating members 10 and 12, and the gaskets 11 and 13 are desirably made of resin.

The electrode body 3 is accommodated inside the prismatic outer package 1 while being covered by an insulation sheet 14. Desirably, the insulation sheet 14 is folded in a box shape or is bag shaped. The sealing plate 2 is joined to an opening edge portion of the prismatic outer package 1 by, for example, laser welding. The sealing plate 2 includes an electrolyte injection hole 15, and the electrolyte injection hole 15 is sealed with a sealing plug 16 after injection of the electrolyte. A gas discharge valve 17 is formed in the sealing plate 2. The gas discharge valve 17 is activated when the pressure inside the battery becomes equivalent to or higher than a predetermined value and is for discharging gas inside the battery to the outside of the battery. Note that the pressure in which the gas discharge valve 17 is activated is set higher than the pressure in which the current breaking mechanism 40 is activated.

The size of the prismatic secondary battery 20 may be, for example, 18 cm in height (a length in a direction orthogonal to the sealing plate 2. The up-down length in FIG. 1), 3 cm in thickness (a length in the front-rear direction in FIG. 1), and 9 cm in width (a length in a direction that is parallel to the sealing plate 2 and that is orthogonal to the thickness direction of the prismatic secondary battery 20. The left-right direction in FIG. 1). Note that the present disclosure is especially effective when the height of the prismatic secondary battery is twice or more of the width of the prismatic secondary battery. The present disclosure is especially effective when the width of the prismatic secondary battery is 10 cm or smaller and the height of the prismatic secondary battery is 17 cm or larger. Furthermore, the present disclosure is especially effective when the battery capacity is 30 Ah or more. Note that the value of the battery capacity may be the value of the design capacity, that is, the value of the battery capacity may be the nominal capacity specified by the manufacturer of the battery.

Subsequently, a method for manufacturing the prismatic secondary battery 20 will be described.

[Fabrication of the Positive Electrode Plates]

A positive electrode slurry containing lithium cobalt oxide as the positive electrode active material, polyvinylidene fluoride (PVdF) as a binding agent, a carbon material as a conductive material, and N-methylpyrrolidone (NMP) is fabricated. The positive electrode slurry is coated on both surfaces of a rectangular aluminum foil that is 15 µm thick and that serves as the positive electrode core body. Subsequently, by drying the above, the N-methylpyrrolidone in the positive electrode slurry is removed and the positive electrode active material layers are formed on the positive electrode core body. Subsequently, a compression process is performed to compress the positive electrode active material layers to a predetermined thickness. The positive electrode plate obtained in the above manner is cut into a predetermined shape.

[Fabrication of the Negative Electrode Plates]

A negative electrode slurry containing graphite as the negative electrode active material, styrene-butadiene rubber (SBR) as the binding agent, carboxymethyl cellulose (CMC) as a thickener, and water is fabricated. The negative electrode slurry is coated on both surfaces of a rectangular copper foil that is 8 µm thick and that serves as the negative electrode core body. Subsequently, by drying the above, the water in the negative electrode slurry is removed and the negative electrode active material layers are formed on the negative electrode core body. Subsequently, a compression process is performed to compress the negative electrode active material layers to a predetermined thickness. The negative electrode plate obtained in the above manner is cut into a predetermined shape.

Figure 5A:
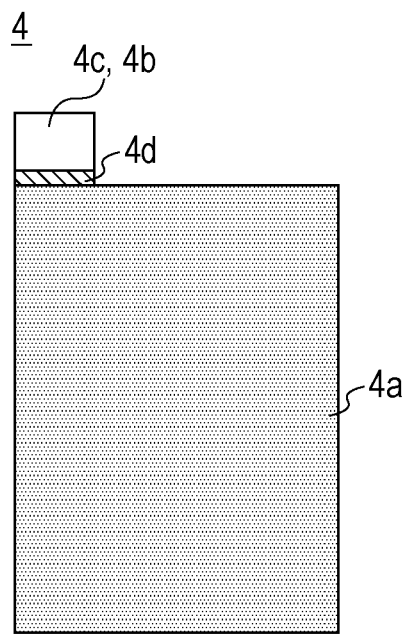
FIGS. 5A and 5B are plan views of a positive electrode plate and a negative electrode plate, respectively, according to the exemplary embodiment.
Figure 5B:
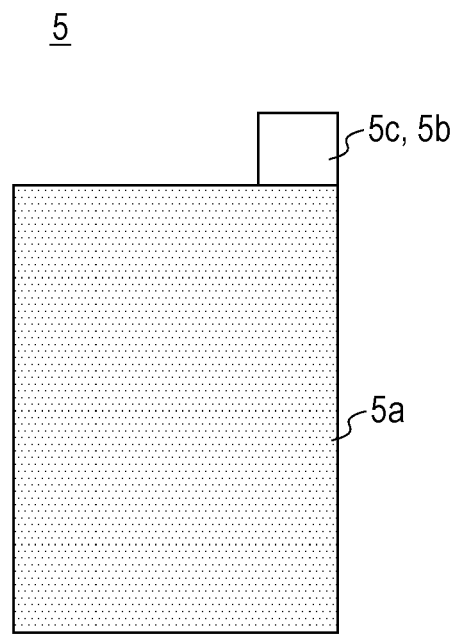

FIG. 5A is a plan view of a positive electrode plate 4 after cutting, and FIG. 5B is a plan view of a negative electrode plate 5 after cutting. The positive electrode plate 4 includes rectangular areas that are positive electrode active material layers 4a formed on both surfaces of the positive electrode core body, and the positive electrode core body exposed portion 4b serving as the positive electrode tab portion 4c is formed on one side of the positive electrode plate 4. The negative electrode plate 5 includes rectangular areas that are negative electrode active material layers 5a formed on both surfaces of the negative electrode core body, and the negative electrode core body exposed portion 5b serving as the negative electrode tab portion 5c is formed on one side of the negative electrode plate 5. Note that the size of the positive electrode plate 4 is slightly smaller than the size of the negative electrode plate 5. Desirably, an insulating layer or a protective layer 4d that has an electric resistance that is higher than that of the positive electrode core body is provided at the base portion of the positive electrode tab portion 4c. Note that conductive members other than the above may be connected to the positive electrode core body exposed portion 4b and the negative electrode core body exposed portion 5b to serve as the positive electrode tab portion 4c and the negative electrode tab portion 5c, respectively.

[Fabrication of the Stacked Electrode Body]

Figure 6:
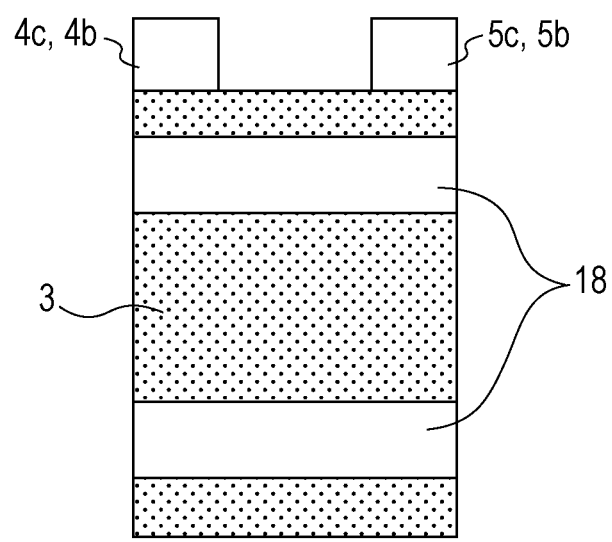
FIG. 6 is a plan view of a multilayered electrode assembly according to the exemplary embodiment.

The electrode body 3 is fabricated by fabricating 100 pieces of positive electrode plates 4 and 101 pieces of negative electrode plates 5 with the above methods and by stacking each positive electrode plate 4 and each negative electrode plate 5 on each other with a rectangular polyolefin separator therebetween. As illustrated in FIG. 6, the stacked electrode body 3 is fabricated such that the positive electrode tab portions 4c of the positive electrode plates 4 and the negative electrode tab portions 5c of the negative electrode plates 5 are stacked at one end portion of the electrode body 3. Desirably, separators are disposed on both outer surfaces of the stacked electrode body 3 and the electrode plates and the separators are fixed with tapes 18 and the like in a stacked state. Alternatively, an adhesion layer may be provided on each separator such that the separators and the positive electrode plates 4, and the separators and the negative electrode plates 5 are adhered to each other. Note that the size of the separator in plan view is the same or larger than the size of the negative electrode plate 5. Each positive electrode plate 4 may be disposed between two separators and after heat welding the outer peripheral of the separators, each of the positive electrode plates 4 and each of the negative electrode plates 5 may be stacked on each other.

<Assembling the Current Breaking Mechanism>

Figure 7:
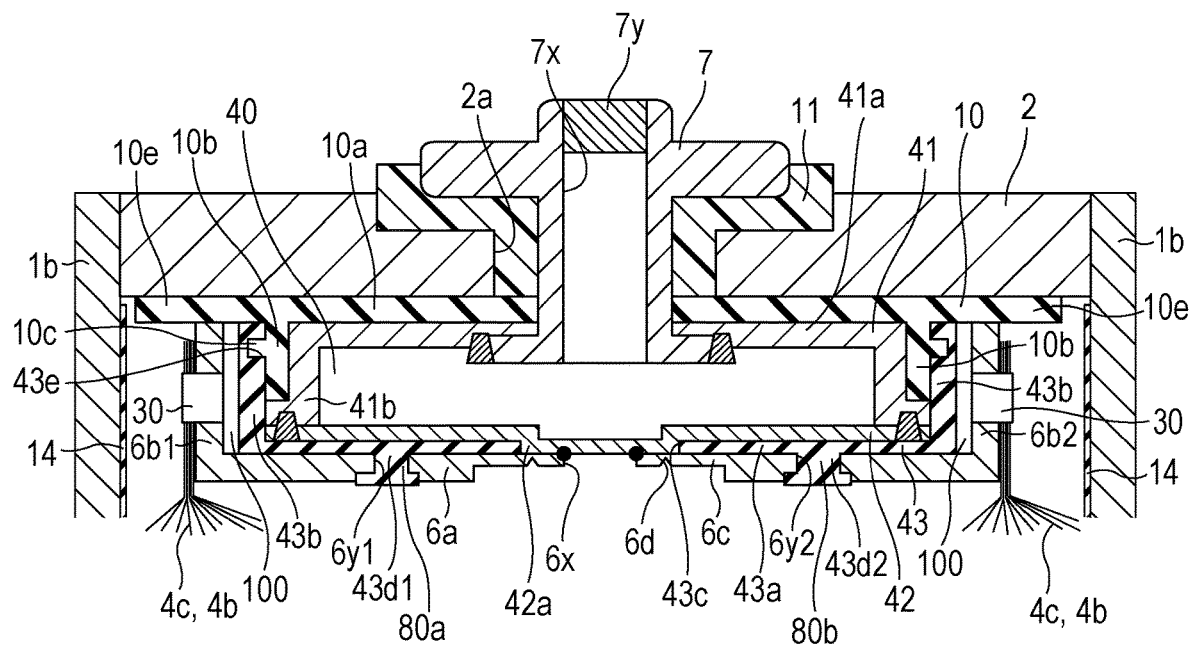
FIG. 7 is an enlarged view of a portion around the current breaking mechanism in FIG. 3.

FIG. 7 is an enlarged view of a portion around the current breaking mechanism 40 in FIG. 3. The method of attaching the positive electrode terminal 7 to the sealing plate 2, and the method of assembling the current breaking mechanism 40 will be described next.

A positive electrode terminal mounting hole 2a is formed in the sealing plate 2. The gasket 11 is disposed on the battery external surface side of the positive electrode terminal mounting hole 2a, and the insulating member 10 and a conductive member 41 are disposed on the battery internal surface side. The positive electrode terminal 7 is inserted from the external side of the battery through the through-holes formed in the gasket 11, the sealing plate 2, the insulating member 10, and the conductive member 41, and the tip of the positive electrode terminal 7 is riveted on the conductive member 41. Note that the riveted portion of the positive electrode terminal 7 is desirably welded to the conductive member 41.

Desirably, the conductive member 41 has a cup-shape that includes an opening portion open towards the electrode body 3 side. The conductive member 41 includes a base portion 41a that is disposed parallel to the sealing plate 2, and a cylindrical portion 41b that extends from the base portion 41a towards the electrode body 3 side. The cylindrical portion 41b may have a cylindrical shape or may be a rectangular tubular portion. The conductive member 41 is made of metal and, desirably, is made of aluminum or an aluminum alloy. The positive electrode terminal 7 is connected to the base portion 41a. Note that the positive electrode terminal 7 and the conductive member 41 may be an integral component. In such a case, the positive electrode terminal 7 is inserted into the through-holes of the components from the interior side of the battery and is riveted on the external side of the battery.

As illustrated in FIG. 7, the insulating member 10 includes an insulating member body portion 10a disposed between the sealing plate 2 and the base portion 41a of the conductive member 41, and a pair of insulating member first side walls 10b that extend from the insulating member body portion 10a towards the electrode body 3 side. A protrusion 10c is formed on the outer surface of each insulating member first side wall 10b.

Subsequently, a deformation plate 42 is disposed so as to close the opening portion of the conductive member 41 on the electrode body 3 side, and the outer peripheral edge of the deformation plate 42 is joined to the conductive member 41 by laser welding or the like. With the above, the opening portion of the conductive member 41 on the electrode body 3 side is sealed in an airtight manner. The deformation plate 42 is made of metal and, desirably, is made of aluminum or an aluminum alloy.

Subsequently, an insulating plate 43 is disposed on the surface of the deformation plate 42 on the electrode body 3 side. The insulating plate 43 includes an insulating plate body portion 43a disposed between the deformation plate 42 and a collector body portion 6a of the positive electrode collector 6, and a pair of insulating plate first side walls 43b that extend from two edge portions of the insulating plate body portion 43a in a short direction of the sealing plate 2 towards the sealing plate 2 side. An insulating plate first through-hole 43c, a first projection 43d1, a second projection 43d2, a third projection 43d3, and a fourth projection 43d4 are formed in the insulating plate body portion 43a. Furthermore, recesses 43e are formed in the inner surface of the insulating plate first side walls 43b.

A projection 42a formed in the middle portion of the deformation plate 42 is inserted into the insulating plate first through-hole 43c formed in the insulating plate body portion 43a. Furthermore, the inner surfaces of the insulating plate first side walls 43b are disposed so as to face the outer surfaces of the insulating member first side walls 1b. Furthermore, by fitting the protrusions 10c and the recesses 43e to each other, the insulating member 10 and the insulating plate 43 are connected to each other. Note that the recesses 43e may be through-holes.

Figure 9:
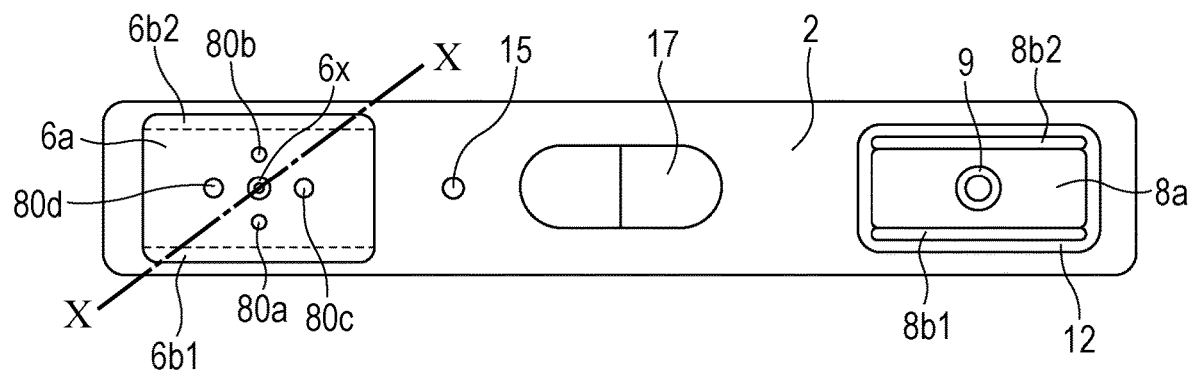
FIG. 9 is a diagram of a battery internal surface side of a sealing plate in which the positive electrode collector and the negative electrode collector have been installed.
Figure 10:
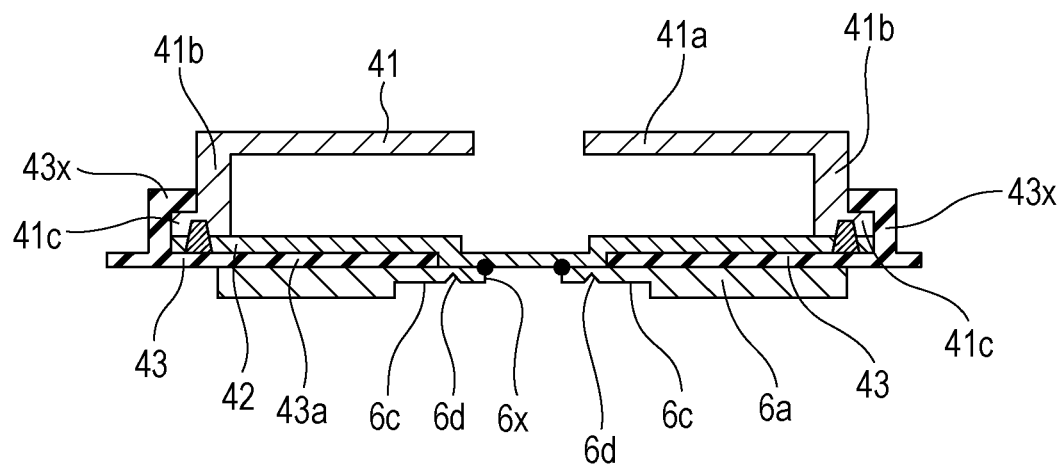
FIG. 10 is a cross-sectional view taken along line X-X in FIG. 9 and illustrates only a conductive member, a deformation plate, and the positive electrode collector.

FIG. 9 illustrates a lower surface of the sealing plate 2 inside the battery, in which the positive electrode terminal 7, the current breaking mechanism 40, the negative electrode collector 8, and the negative electrode terminal 9 are installed in the sealing plate 2. FIG. 10 is a cross-sectional view taken along line X-X in FIG. 9 and selectively illustrates only the conductive member 41, the deformation plate 42, and the insulating plate 43. As illustrated in FIG. 10, desirably, conductive member fixing portions 43x are provided in the insulating plate 43. Furthermore, desirably, the insulating plate 43 is fixed to the conductive member 41 by hooking the conductive member fixing portions 43x to flange portions 41c of the conductive member 41.

Desirably, the insulating plate 43 is directly or indirectly fixed to the conductive member 41. As a method of directly fixing the insulating plate 43 and the conductive member 41 to each other, as described above, the conductive member fixing portions 43x may be provided in the insulating plate 43 and the conductive member fixing portions 43x may be fixed to the conductive member 41. Furthermore, as a method of indirectly fixing the insulating plate 43 and the conductive member 41 to each other, as described above, the insulating plate 43 and the conductive member 41 may be fixed to each other through the insulating member 10. Since the conductive member 41 and the insulating member 10 are fixed to the sealing plate 2 in an integrated manner with the positive electrode terminal 7, the conductive member 41 and the insulating member 10 are fixed to each other. Furthermore, the insulating member 10 and the insulating plate 43 are fixed to each other by being fitted to each other. Accordingly, the insulating plate 43 and the conductive member 41 are fixed to each other through the insulating member 10. Note that the insulating plate 43 may be directly connected to the conductive member 41 only or may be indirectly connected to the conductive member 41 only.

Figure 8:
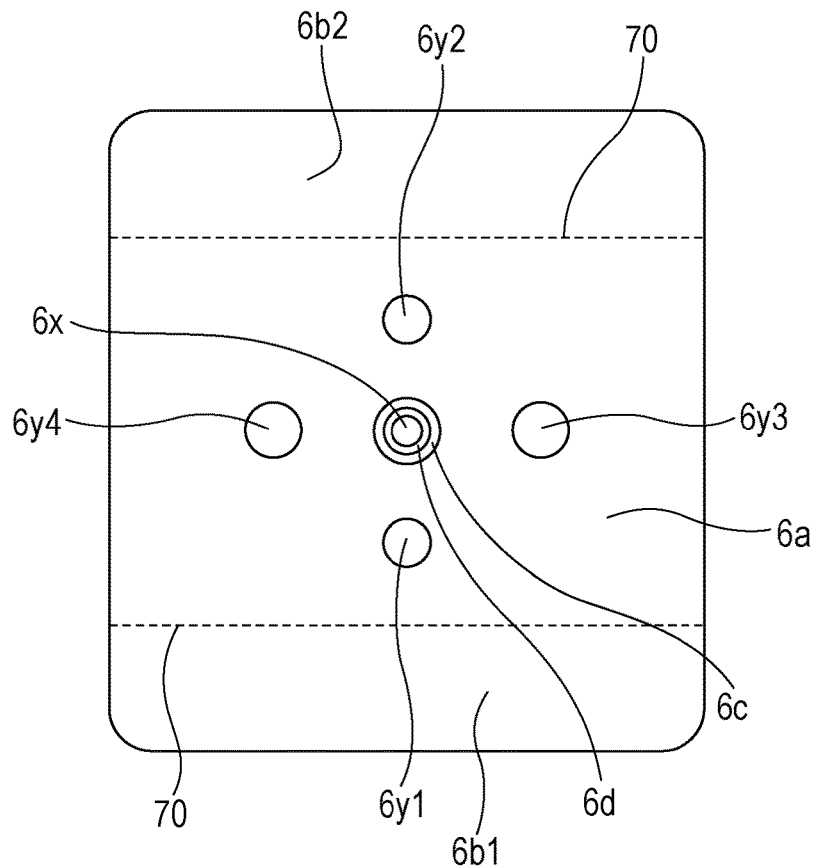
FIG. 8 is a plan view of a positive electrode collector according to the exemplary embodiment before bending.

A configuration of the positive electrode collector 6 will be described herein. FIG. 8 is a plan view of the positive electrode collector 6 before bending, and illustrates a surface thereof on the electrode body 3 side. The positive electrode collector 6 includes the collector body portion 6a, a first collector connection 6b1, and a second collector connection 6b2. The broken lines indicate the portions that are bent (bend portions 70). A through-hole 6x for connection is formed at the center of the collector body portion 6a. A thin wall portion 6c is formed around the through-hole 6x for connection. Furthermore, an annular groove portion 6d is provided inside the thin wall portion 6c so as to surround the through-hole 6x for connection. The thickness (the residual thickness) of the groove portion 6d is smaller than that of the thin wall portion 6c. Note that the annual groove portion 6d is a fragile portion and is broken upon deformation of the deformation plate 42. In other words, the fragile portion is the portion to be broken. Note that since it is only sufficient that the conductive path is disconnected upon breakage of the fragile portion, both of the thin wall portion 6c and the groove portion 6d do not have to be provided. Only the thin wall portion 6c or only the groove portion 6d may be provided. Alternatively, the joint portion between the deformation plate 42 and the collector body portion 6a may be a fragile portion without providing the thin wall portion 6c or the groove portion 6d.

A first through-hole 6y1 for fixing, a second through-hole 6y2 for fixing, a third through-hole 6y3 for fixing, and a fourth through-hole 6y4 for fixing are provided in the collector body portion 6a.

Note that in order to facilitate bending of the positive electrode collector 6, cutaways may be provided at both ends of the bend portions 70. Alternatively, thin wall portions or through-holes may be provided along the bend portions 70. Alternatively, in the longitudinal direction of the sealing plate 2 (in the left-right direction in FIG. 8), the lengths of the collector connections 6b may be shorter than the length of the collector body portion 6a.

In the positive electrode collector 6 illustrated in FIG. 8, bending is performed such that the first collector connection 6b1 and the second collector connection 6b2 are bent with respect to the collector body portion 6a towards the far side in a direction perpendicular to the drawing plane of FIG. 8. Subsequently, the positive electrode collector 6 is disposed on the underside of the insulating plate 43.

In so doing, the first projection 43d1, the second projection 43d2, the third projection 43d3, and the fourth projection 43d4 formed in the insulating plate 43 are respectively inserted into the first through-hole 6y1 for fixing, the second through-hole 6y2 for fixing, the third through-hole 6y3 for fixing, and the fourth through-hole 6y4 for fixing formed in the positive electrode collector 6. Subsequently, by expanding the diameters of the tips of the first projection 43d1, the second projection 43d2, the third projection 4343, and the fourth projection 43d4, the positive electrode collector 6 is fixed to the insulating plate 43. A first fixed portion 80a, a second fixed portion 80b, a third fixed portion 80c, and a fourth fixed portion 80d are formed in the above manner. Note that the fixed portions may be formed by press-fitting the projections into the through-holes for fixing.

Subsequently, gas is sent in through a terminal through-hole 7x formed in the positive electrode terminal 7 from the external side of the battery, such that the deformation plate 42 is urged against the collector body portion 6a. In the above state, the edge portion of the through-hole 6x for connection provided in the collector body portion 6a and the deformation plate 42 are joined together by laser welding or the like. Note that the through-hole 6x for connection is not an essential configuration and a collector body portion 6a that has no through-hole 6x for connection may be joined to the deformation plate 42. Note that the terminal through-hole 7x is sealed with a plug 7y.

<Installing the Negative Electrode Terminal in the Sealing Plate>

A negative electrode terminal mounting hole 2b is formed in the sealing plate 2. The gasket 13 is disposed on the battery external surface side of the negative electrode terminal mounting hole 2b, and the insulating member 12 and the negative electrode collector 8 are disposed on the battery internal surface side. The negative electrode terminal 9 is inserted from the external side of the battery through the through-holes formed in the gasket 13, the sealing plate 2, the insulating member 12, and the negative electrode collector 8, and the tip of the negative electrode terminal 9 is riveted on the negative electrode collector 8. Furthermore, the riveted portion of the negative electrode terminal 9 is welded to the negative electrode collector 8.

<Connecting the Positive Electrode Tab Portions and the Positive Electrode Collector to Each Other>

As illustrated in FIG. 7, the stacked positive electrode tab portions 4c are disposed on the first collector connection 6b1 and the second collector connection 6b2. Subsequently, the stacked positive electrode tab portions 4c and the first collector connection 6b1 are joined to each other, and the stacked positive electrode tab portions 4c and the second collector connection 6b2 are joined to each other. Desirably, a gap 100 is provided between the first collector connection 6b1 and the insulating plate first side walls 43b, and between the second collector connection 6b2 and the insulating plate first side walls 43b. With the above, an adverse effect on the insulating plate 43 exerted by the heat generated during welding can be suppressed. Alternatively, a heat resistance member may be disposed between the first collector connection 6b1 and the insulating plate first side walls 43b, and between the second collector connection 6b2 and the insulating plate first side walls 43b. The heat resistance member is desirably a member having a melting point that is higher than the melting point of the insulating plate 43.

A joint portion 30 is formed in each of the connection between the first collector connection 6b and the positive electrode tab portions 4c and the connection between the second collector connection 6b2 and the positive electrode tab portions 4c. The joining method is not limited to any method in particular and, for example, resistance welding, ultrasonic welding, welding using a high energy ray such as laser may be used. However, when joining the positive electrode tab portions 4c to the positive electrode collector 6 after bending, welding using a high energy ray is desirable.

Note that, desirably, the positive electrode tab portions 4c are joined to each other in advance before joining the stacked positive electrode tab portions 4c and the positive electrode collector 6 to each other.

Figure 11:
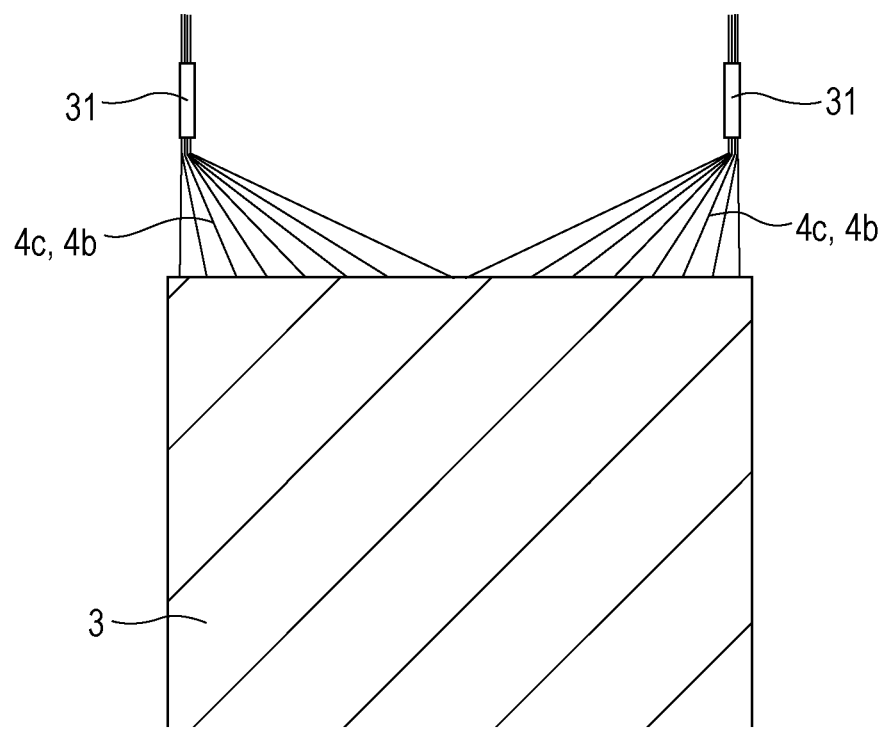
FIG. 11 is a partial cross-sectional view of a portion near a positive electrode tab portion of an electrode body according to a modification and is a cross-sectional view viewed in a direction corresponding to FIG. 2.

For example, as illustrated in FIG. 11, two portions in which the positive electrode tab portions 4c are stacked are provided. Subsequently, the stacked positive electrode tab portions 4c are joined to each other to form preliminary joint portions 31. As illustrated in FIG. 11, by joining the positive electrode tab portions 4c to each other in advance, work of disposing the positive electrode tab portions 4c on the positive electrode collector 6 becomes extremely easy.

<Connecting the Negative Electrode Tab Portion and the Negative Electrode Collector to Each Other>

The stacked negative electrode tab portions 5c are disposed on the first collector connection 8b1 and the second collector connection 8b2 of the negative electrode collector 8, and the negative electrode tab portions 5c and the first collector connection 8b1 are joined to each other and the negative electrode tab portions 5c and the second collector connection 8b2 are joined to each other. The joining method is not limited to any method in particular and, for example, resistance welding, ultrasonic welding, welding using a high energy ray such as a laser may be used.

<Assembling the Prismatic Secondary Battery>

The electrode body 3 that is connected to the sealing plate 2 is disposed inside the insulation sheet 14 formed in a box shape and is inserted into the prismatic outer package 1. Subsequently, the sealing plate 2 and the prismatic outer package 1 is joined together by laser welding or the like and the opening of the prismatic outer package 1 is sealed. After the above, nonaqueous electrolyte containing an electrolyte solvent and electrolyte salt is injected through the electrolyte injection hole 15 provided in the sealing plate 2. Subsequently, the electrolyte injection hole 15 is sealed with the sealing plug 16.

Note that an insulation sheet is desirably disposed between the sealing plate 2 and the electrode body 3 to reliably insulate the electrode body 3 (especially the positive electrode tab portions 4c and the negative electrode tab portions 5c) and the sealing plate 2 from each other. For example, a portion of the insulation sheet 14 can be disposed between the sealing plate 2 and the electrode body 3. Alternatively, an insulation sheet different from the insulation sheet 14 can be disposed between the sealing plate 2 and the electrode body 3. Furthermore, an insulating plate that has a thickness that is larger than that of the insulation sheet 14 can be disposed.

<Prismatic Secondary Battery 20>

As illustrated in FIGS. 2 to 4, in the prismatic secondary battery 20, the positive electrode tab portions 4c and the negative electrode tab portions 5c are disposed on an end portion of the electrode body 3 on the sealing plate 2 side. Accordingly, spaces in the prismatic outer package 1 in which members that are not involved with generation of electricity are disposed can be reduced such that a prismatic secondary battery that is high in energy density is obtained. Furthermore, as illustrated in FIG. 1, in the prismatic secondary battery 20, the sealing plate 2 is disposed on a surface that has the smallest area among the six surfaces of the battery case constituted by the prismatic outer package 1 and the sealing plate 2. In other words, the area of each of the sealing plate 2 and the bottom 1a of the prismatic outer package 1 is smaller than the area of each of the four side walls (the pair of large-area side walls 1b and the pair of small-area side walls 1c) of the prismatic outer package 1. Accordingly, the prismatic secondary battery becomes further high in energy density. However, as regards the prismatic outer package 1 used in the prismatic secondary battery 20, a bottomed tubular prismatic outer package may be used in which the position corresponding to the opening includes a side wall and the position corresponding to the small-area side wall 1c includes an opening, and the opening may be sealed with a sealing plate.

As illustrated in FIG. 7, the collector body portion 6a is disposed on the electrode body 3 side of the deformation plate 42 (on the lower side in FIG. 7). Furthermore, the connection between the first collector connection 6b1 and the positive electrode tab portions 4c and the connection between the second collector connection 6b2 and the positive electrode tab portions 4c are disposed between the spaces between the current breaking mechanism 40 and the large-area side walls 1b. Accordingly, the space in which an electricity generation portion (the portion in which the positive electrode plates and the negative electrode plates are stacked) of the electrode body 3 that is involved in generating electricity is disposed can be increased and a prismatic secondary battery that is further high in energy density can be obtained.

Note that the first collector connection 6b1 and the second collector connection 6b2 are disposed so as to extend towards the sealing plate 2 side (the upper side) from the collector body portion 6a in the direction orthogonal to the sealing plate 2. Accordingly, the connection between the first collector connection 6b1 and the positive electrode tab portions 4c and the connection between the second collector connection 6b2 and the positive electrode tab portions 4c are positioned on the sealing plate 2 side (the other side) with respect to the collector body portion 6a. Furthermore, the connection between the first collector connection 6b1 and the positive electrode tab portions 4c and the connection between the second collector connection 6b2 and the positive electrode tab portions 4c are disposed between the current breaking mechanism 40 and the large-area side walls 1b.

Note that the collector connection may be either one of the first collector connection 6b1 and the second collector connection 6b2. However, by providing two collector connections, variation in the lengths of the positive electrode tab portions 4c can be made small.

Desirably, the end portion of the insulation sheet 14 on the sealing plate 2 side is disposed so as to extend to the sealing plate 2 side with respect to the end portion of the first collector connection 6b1 on the sealing plate 2 side and the end portion of the second collector connection 6b2 on the sealing plate 2 side. With the above, the prismatic outer package 1 and the positive electrode collector 6 can be prevented from coming in contact with each other.

Furthermore, desirably, an insulating member is disposed between the end portion of the first collector connection 6b1 on the sealing plate 2 side and the sealing plate 2 and between the end portion of the second collector connection 6b2 on the sealing plate 2 side and the sealing plate 2. With the above, the sealing plate 2 and the positive electrode collector 6 can be prevented from coming in contact with each other. Note that in the prismatic secondary battery 20, the insulating member 10 includes extension portions 10e, and the extension portions 10e are disposed between the end portion of the first collector connection 6b1 on the sealing plate 2 side and the sealing plate 2 and between the end portion of the second collector connection 6b2 on the sealing plate 2 side and the sealing plate 2.

Furthermore, desirably, in the positive electrode collector 6, the fixed portions 80a and 80b are formed midway of the passages connecting the joint portions 30 and the groove portion 6d, serving as the fragile portion, at the shortest distance. With the above, an adverse effect exerted by transmission of heat generated during formation of the joint portions 30 to the fragile portion can be suppressed.

Description of modifications will be given below. Note that in the following modifications, portions not described in particular have basically the same configuration as those of the prismatic secondary battery 20. In the following modifications, components that are the same as those of the prismatic secondary battery 20 are denoted with the same reference numerals as those of the prismatic secondary battery 20.

<First Modification>

Figure 12:
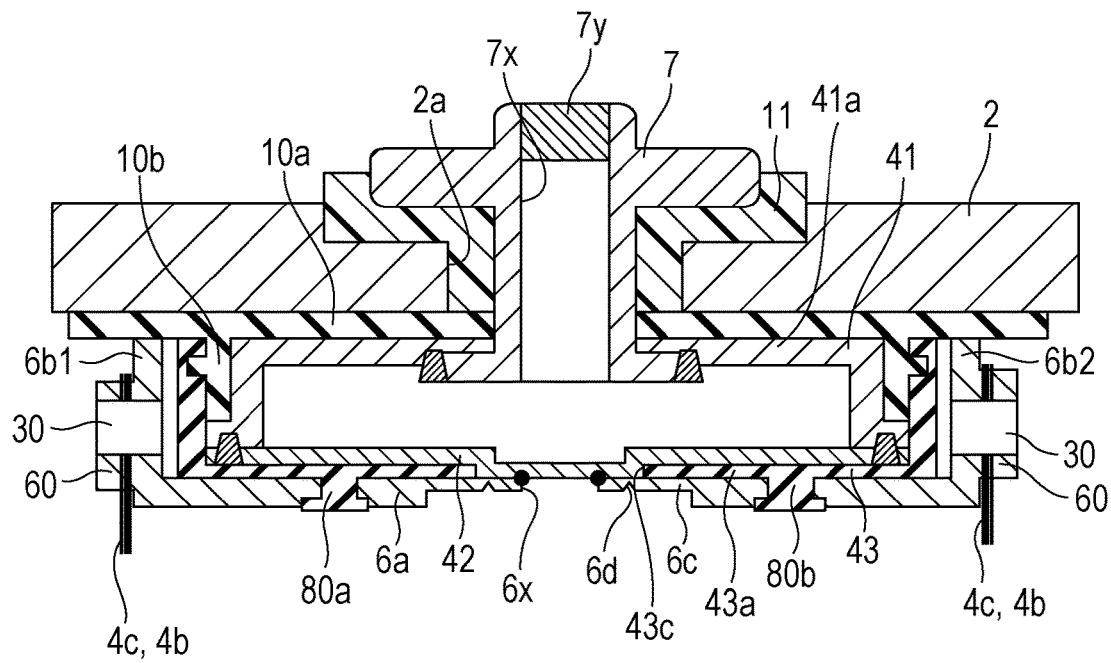
FIG. 12 is a cross-sectional view of a prismatic secondary battery according to a modification, corresponding to FIG. 7.

FIG. 12 is a cross-sectional view of a prismatic secondary battery according to a first modification, corresponding to FIG. 7. As illustrated in FIG. 12, receiving components 60 may be used. While a receiving component 60 and the first collector connection 6b1 are holding the positive electrode tab portions 4c in between, the first collector connection 6b1 and the positive electrode tab portions 4c may be connected to each other. Furthermore, while a receiving component 60 and the second collector connection 6b2 are holding the positive electrode tab portions 4c in between, the second collector connection 6b2 and the positive electrode tab portions 4c may be connected to each other. By using such receiving components 60, the connection between the positive electrode tab portions 4c and the positive electrode collector 6 can be reinforced. Note that when joining the positive electrode tab portions 4c and the positive electrode collector 6 to each other with irradiation of high energy ray, a slit or a thin wall portion may be provided in each receiving component 60, and joining may be performed at the slit or the thin wall portion.

<Second Modification>

Figure 13:
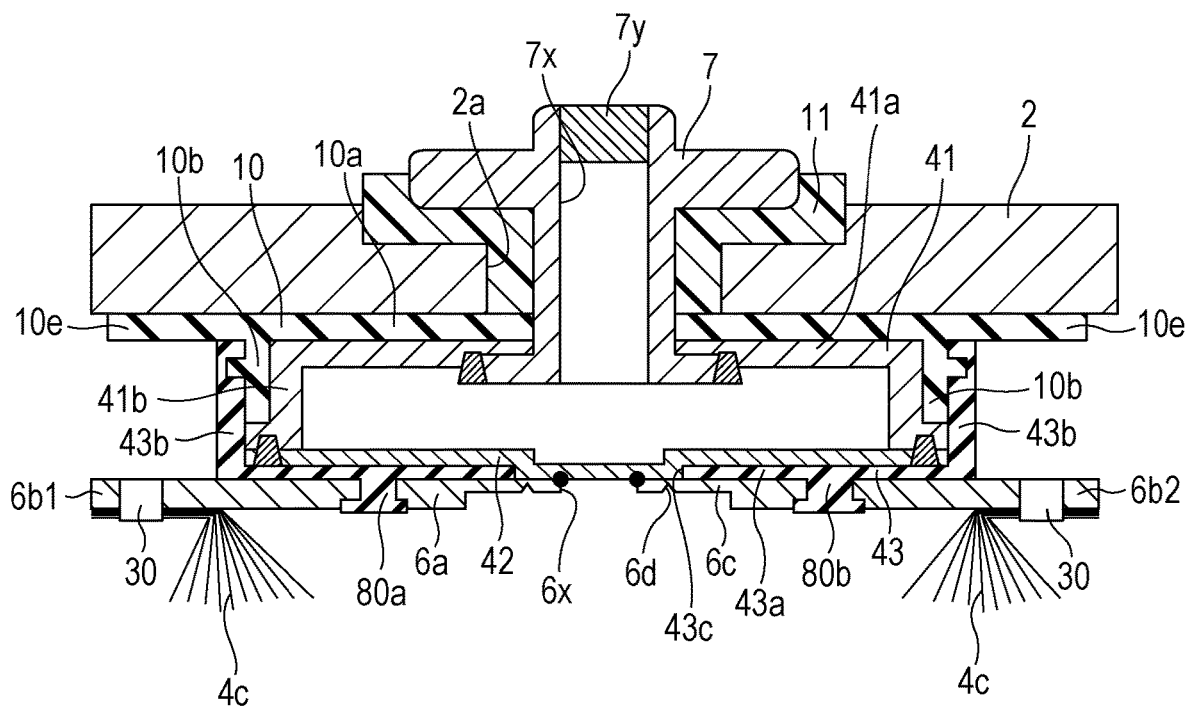
FIG. 13 is a diagram illustrating a manufacturing process of a prismatic secondary battery according to a modification and is a cross-sectional view corresponding to FIG. 7.

FIG. 13 is a diagram illustrating a manufacturing process of a prismatic secondary battery according to a second modification and is a cross-sectional view of the prismatic secondary battery corresponding to FIG. 7. As illustrated in FIG. 13, in a method of manufacturing the prismatic secondary battery according to the second modification, the positive electrode collector 6 that has not been bent is fixed to the insulating plate 43 and the deformation plate 42, and the positive electrode tab portions 4c are connected to the positive electrode collector 6. Subsequently, the first collector connection 6b1 and the second collector connection 6b2 to which the positive electrode tab portions 4c have been connected are bent with respect to the collector body portion 6a. With such a method, connection between the positive electrode collector 6 and the positive electrode tab portions 4c are facilitated further. In particular, such a method facilitates ultrasonic welding and resistance welding. Note that when such a method is adopted, desirably, cutaways at both ends of the bend portions 70 of the positive electrode collector 6, or thin wall portions and through-holes on the bend portions 70 are provided.

<Third Modification>

Figure 14:
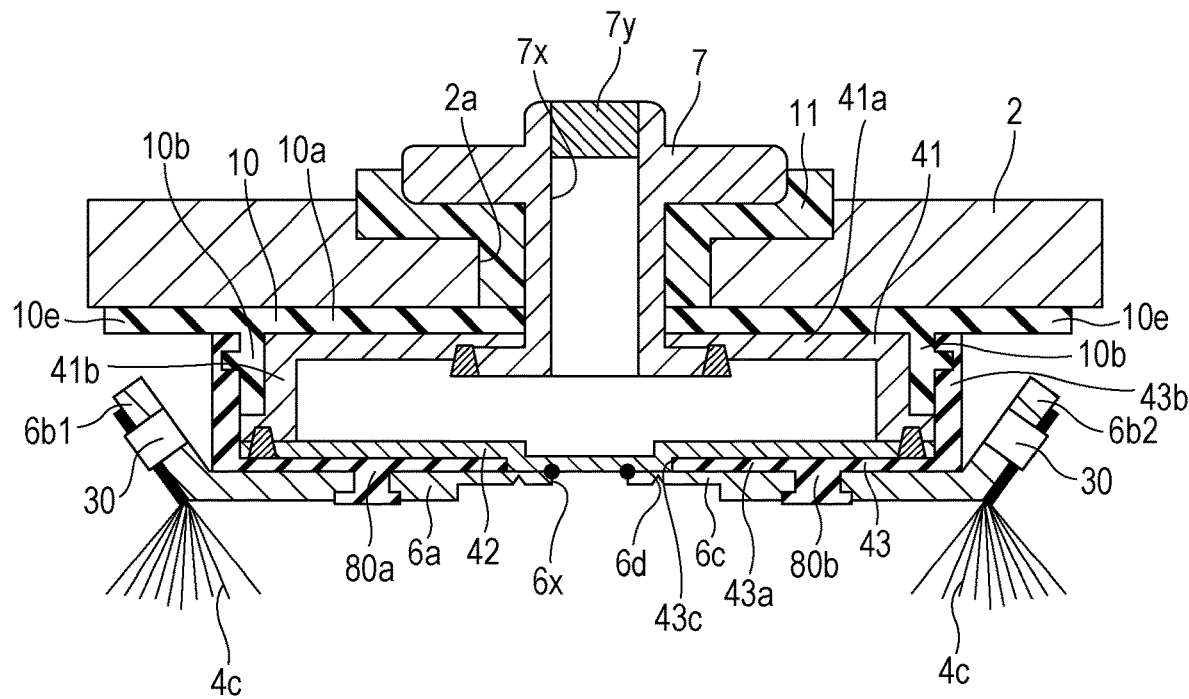
FIG. 14 is a cross-sectional view of a prismatic secondary battery according to a modification, corresponding to FIG. 7.

FIG. 14 is a cross-sectional view of a prismatic secondary battery according to a third modification, corresponding to FIG. 7. As illustrated in FIG. 14, an angle of the first collector connection 6b1 against the collector body portion 6a and an angle of the second collector connection 6b2 against the collector body portion 6a may be smaller than the prismatic secondary battery 20.

Figure 15:
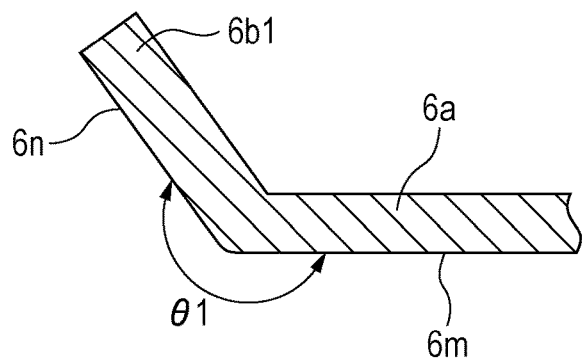
FIG. 15 is an enlarged view of the positive electrode collector in FIG. 14.

Note that FIG. 15 selectively illustrates only the positive electrode collector 6 in FIG. 14 and is an enlarged view of the portion around the first collector connection 6b1. An angle $\theta 1$ of the collector connection (the first collector connection 6b1, the second collector connection 6b2) against the collector body portion 6a is an angle formed between a surface 6m of the collector body portion 6a on the electrode body side and a surface 6n of the collector connection (the first collector connection 6b1, the second collector connection 6b2) on the large-area side wall 1b side. The angle $\theta 1$ is preferably 225° to 300°. Note that in FIG. 7, the angle $\theta 1$ is 270°.

In the prismatic secondary battery according to the third modification, the angle $\theta 1$ is smaller than 270°. With such a configuration, connection between the positive electrode collector 6 and the positive electrode tab portions 4c are facilitated further compared with a case in which the angle $\theta 1$ is 270°. In particular, such a method facilitates ultrasonic welding and resistance welding. Furthermore, since the distance between the collector connection (6b1, 6b2) and the insulating plate 43 can be made large, an adverse effect exerted by heat generated during formation of the joint portions 30 to the insulating plate 43 can be suppressed.

Note that as illustrated in the third modification, after the positive electrode tab portions 4c and the positive electrode collector 6 are connected to each other while the angle θ1 is smaller than 270°, bending may be further performed on the positive electrode collector 6 and the angle θ1 may be increased further.

OTHERS

Desirably, an overcharge inhibitor, which generates gas when the battery becomes overcharged, is included in the battery. In a case of a nonaqueous electrolyte secondary battery, desirably, lithium carbonate is included in the positive electrode active material layers or cyclohexylbenzene or the like is included in the nonaqueous electrolyte.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A prismatic secondary battery, comprising:
a positive electrode plate that includes a positive electrode tab portion;
a negative electrode plate that includes a negative electrode tab portion;
an electrode body that includes the positive electrode plate and the negative electrode plate;
a collector electrically connected to the positive electrode plate or the negative electrode plate;
a prismatic outer package that includes an opening, a bottom, a pair of large-area side walls and a pair of small-area side walls, the prismatic outer package housing the electrode body;
a sealing plate that seals the opening;
a positive electrode terminal electrically connected to the positive electrode plate, the positive electrode terminal being attached to the sealing plate;
a negative electrode terminal electrically connected to the negative electrode plate, the negative electrode terminal being attached to the sealing plate; and
a pressure-sensitive current breaking mechanism provided in a conductive path between the positive electrode plate and the positive electrode terminal or in a conductive path between the negative electrode plate and the negative electrode terminal, wherein
the positive electrode tab portion and the negative electrode tab portion are disposed at an end portion of the electrode body on a sealing plate side,
the collector includes a collector body portion and a collector connection,
the current breaking mechanism includes a conductive member having an opening portion on an electrode body side, a deformation plate that seals the opening portion, and the collector body portion that is disposed on the electrode body side of the deformation plate and that is connected to the deformation plate,
the collector connection is disposed between the current breaking mechanism and one of the large-area side walls,
the positive electrode tab portion or the negative electrode tab portion is connected to the collector connection and is located between the collector connection and the nearest large-area side wall,
the conductive path between the positive electrode plate and the positive electrode terminal or the conductive path between the negative electrode plate and the negative electrode terminal is disconnected upon breakage of a fragile portion caused by deformation of the deformation plate deforming when a pressure inside the battery is equivalent to or above a predetermined value,.
wherein the collector body portion is disposed between the deformation plate and the electrode body, and
the collector connection extends towards the sealing plate side from an end portion of the collector body portion.

2. The prismatic secondary battery according to claim 1, wherein
the fragile portion is formed in the collector body portion and around a connection between the collector body portion and the deformation plate.

3. The prismatic secondary battery according to any one of claim 1, wherein
the collector includes a first collector connection and a second collector connection that serve as the collector connection,
the first collector connection is disposed between one of the pair of large-area side walls and the current breaking mechanism, and
the second collector connection is disposed between the other one of the pair of large-area side walls and the current breaking mechanism.

4. The prismatic secondary battery according to any one of claim 1, wherein
an angle of the collector connection against the collector body portion is 225° to 300°.

5. The prismatic secondary battery according to any one of claim 1, further comprising:
a receiving component, wherein
the positive electrode tab portion or the negative electrode tab portion is connected to the collector connection while held between the collector connection and the receiving component.

6. An assembled battery comprising:
a plurality of the prismatic secondary batteries according to any one of claim 1.

7. The prismatic secondary battery according to claim 1, wherein
the fragile portion comprises a groove portion provided in the collector body portion, the groove portion surrounding an area where the deformation plate and the collector body portion are connected to each other.

8. The prismatic secondary battery according to claim 1, wherein
an insulating member is disposed between the conductive member and the collector connection.

9. The prismatic secondary battery according to claim 1, wherein
the collector comprises a positive electrode collector electrically connected to the positive electrode plate, and
the prismatic secondary battery further includes a negative electrode collector electrically connected to the negative electrode plate,
the negative electrode collector including:
a negative electrode body portion to which the negative electrode terminal is connected; and a negative electrode connection that extends from an end portion of the negative electrode body portion towards the electrode body side, wherein the negative electrode tab portion is connected to the negative electrode collector connection.

10. The prismatic secondary battery according to claim 1, wherein a plurality of the positive electrode tab portions or a plurality of the negative electrode tab portions are stacked one upon each other to be collectively connected to the collector connection.

11. The prismatic secondary battery according to claim 10, wherein the plurality of the positive electrode tab portions or the plurality of the negative electrode tab portions are collectively connected to a portion of the collector connection which is positioned between the conductive member and the large-area side walls.

12. The prismatic secondary battery according to claim 1, wherein the collector connection includes a first collector connection and a second collector connection, wherein the first collector connection extends from a first end of the collector body portion towards the sealing plate, the second collector connection extends from a second end opposite the first end of the collector body portion towards the sealing plate, a first positive electrode tab group formed of a plurality of the positive electrode tab portions stacked one upon each other is connected to the first collector connection, and a second positive electrode tab group formed of a plurality of the positive electrode tab portions stacked one upon each other is connected to the second collector connection.

13. The prismatic secondary battery according to claim 1, wherein an insulating member is disposed between an edge of the collector connection and the sealing plate.

14. The prismatic secondary battery according to claim 1, wherein an insulation sheet is disposed between the large-area side walls and either one of the positive electrode tab portion and the negative electrode tab portion which is connected to the collector connection.

15. A method for manufacturing a prismatic secondary battery including a positive electrode plate that includes a positive electrode tab portion, a negative electrode plate that includes a negative electrode tab portion, an electrode body that includes the positive electrode plate and the negative electrode plate, a collector electrically connected to the positive electrode plate or the negative electrode plate, a prismatic outer package that includes an opening, a bottom, a pair of large-area side walls and a pair of small-area side walls, the prismatic outer package housing the electrode body, a sealing plate that seals the opening, a positive electrode terminal electrically connected to the positive electrode plate, the positive electrode terminal being installed in the sealing plate, a negative electrode terminal electrically connected to the negative electrode plate, the negative electrode terminal being installed in the sealing plate, a pressure-sensitive current breaking mechanism provided in a conductive path between the positive electrode plate and the positive electrode terminal or in a conductive path between the negative electrode plate and the negative electrode terminal, in which the positive electrode tab portion and the negative electrode tab portion are disposed at an end portion of the electrode body on a sealing plate side, the collector includes a collector body portion and a collector connection, the current breaking mechanism includes a conductive member having an opening portion on an electrode body side, a deformation plate that seals the opening portion, and the collector body portion that is disposed on the electrode body side of the deformation plate and that is connected to the deformation plate, the collector connection is disposed between the current breaking mechanism and one of the large-area side walls, the positive electrode tab portion or the negative electrode tab portion is connected to the collector connection and is located between the collector connection and the nearest large-area side wall, and the conductive path between the positive electrode plate and the positive electrode terminal or the conductive path between the negative electrode plate and the negative electrode terminal is disconnected upon breakage of a fragile portion caused by deformation of the deformation plate deforming when a pressure inside the battery is equivalent to or above a predetermined value, the method comprising:

a tab-connection step of connecting the collector connection to the positive electrode tab portion or the negative electrode tab portion;

a bending step of bending the collector connection with respect to the collector body portion after the tab-connection step,.

wherein the collector body portion is disposed between the deformation plate and the electrode body, and the collector connection extends towards the sealing plate side from an end portion of the collector body portion.

16. A prismatic secondary battery, comprising:

a positive electrode plate that includes a positive electrode tab portion;

a negative electrode plate that includes a negative electrode tab portion;

an electrode body that includes the positive electrode plate and the negative electrode plate;

a collector electrically connected to the positive electrode plate or the negative electrode plate;

a prismatic outer package that includes an opening, a bottom, a pair of large-area side walls and a pair of small-area side walls, the prismatic outer package housing the electrode body;

a sealing plate that seals the opening;

a positive electrode terminal electrically connected to the positive electrode plate, the positive electrode terminal being attached to the sealing plate;

a negative electrode terminal electrically connected to the negative electrode plate, the negative electrode terminal being attached to the sealing plate; and a pressure-sensitive current breaking mechanism provided in a conductive path between the positive electrode plate and the positive electrode terminal or in a conductive path between the negative electrode plate and the negative electrode terminal, wherein the positive electrode tab portion and the negative electrode tab portion are disposed at an end portion of the electrode body on a sealing plate side, the collector includes a collector body portion and a collector connection, the current breaking mechanism includes a conductive member having an opening portion on an electrode body side, a deformation plate that seals the opening portion, and the collector body portion that is disposed on the electrode body side of the deformation plate and that is connected to the deformation plate, the collector connection is disposed between the conductive member and one of the large-area side walls, the positive electrode tab portion or the negative electrode tab portion is connected to the collector connection and is located between the collector connection and the nearest large-area side wall, the conductive path between the positive electrode plate and the positive electrode terminal or the conductive path between the negative electrode plate and the negative electrode terminal is disconnected upon breakage of a fragile portion caused by deformation of the deformation plate deforming when a pressure inside the battery is equivalent to or above a predetermined value, wherein the collector body portion is disposed between the deformation plate and the electrode body, and the sealing plate is closer to the conductive member than to the collector body portion.

17. The prismatic secondary battery according to claim 16, wherein
the fragile portion comprises a groove portion provided in the collector body portion, the groove portion surrounding an area where the deformation plate and the collector body portion are connected to each other.

18. The prismatic secondary battery according to claim 16, wherein
an insulating member is disposed between the conductive member and the collector connection.

19. The prismatic secondary battery according to claim 16, wherein
the collector comprises a positive electrode collector electrically connected to the positive electrode plate, and the prismatic secondary battery further includes a negative electrode collector electrically connected to the negative electrode plate, the negative electrode collector including:

a negative electrode body portion to which the negative electrode terminal is connected; and a negative electrode connection that extends from an end portion of the negative electrode body portion towards the electrode body side, wherein the negative electrode tab portion is connected to the negative electrode collector connection.

* * * * *